Patented Feb. 14, 1950

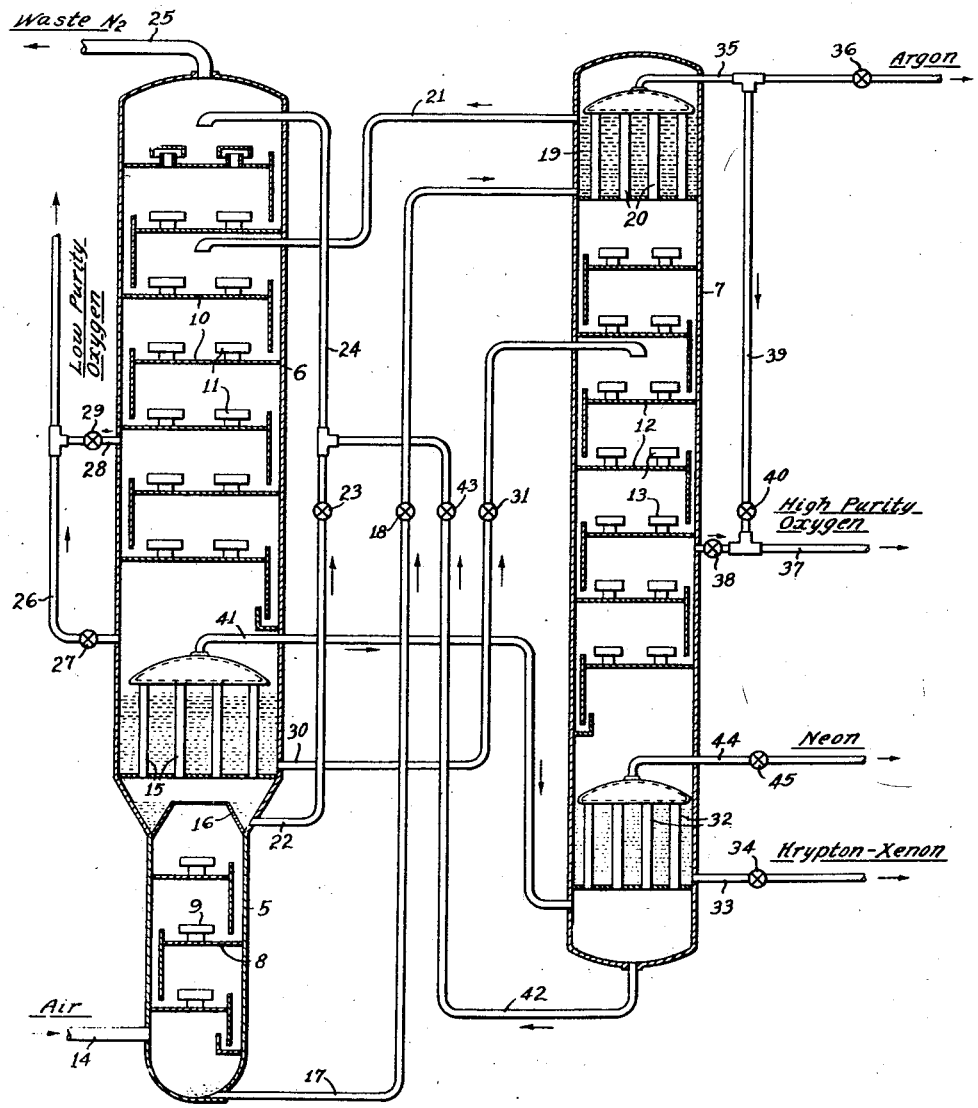

2,497,589

UNITED STATES PATENT OFFICE 2,497,589

SEPARATION AND RECOVERY OF THE CONSTITUENTS OF AIR

Wolcott Dennis, Darien, Conn., assignor to Air Reduction Company, Incorporated, New York, N. Y., a corporation of New York Application April 18, 1947, Serial No. 742,329

5 Claims. (Cl. 62—175.5)

This invention relates to the separation and recovery of the constituents of atmospheric air and more particularly to a method permitting simultaneous recovery of both low and high purity oxygen and also of the rare gases of the atmosphere in separate fractions.

The method is designed especially for operation involving the production of low cost or "tonnage" oxygen affording also the possibility of providing high purity oxygen, i. e. 99.5% or better and the rare gases of the atmosphere in commercial quantities. Thus an oxygen concentrate containing most of the krypton-xenon present in the air may be recovered. Neon, including helium and hydrogen, the latter in relatively small proportions, is also produced. Argon may be recovered as a separate fraction. Owing to the relatively large volume of air treated, the available quantities of the rare gases are considerable.

It is the object, therefore, of the invention to provide a simple, reliable and economical method of and apparatus for separating the constituents of air into several fractions including the gases mentioned.

Other objects and advantages of the invention will be better understood by reference to the following specification and the accompanying drawing, which illustrates diagrammatically an apparatus suitable for the practice of the invention.

Referring to the drawing, 5 and 6 represent the high and low pressure sections respectively of a primary rectification column. An auxiliary column 7 is provided to further rectify products of the primary rectification to effect thereby the desired separation. The high pressure section 5 of the primary column is provided with trays 8 with the usual caps 9, and the low pressure section 6 is provided with trays 10 and caps 11. The auxiliary column 7 is similarly provided with trays 12 and caps 13. Any other effective means may be employed in the columns to ensure proper contact between the liquids flowing downwardly therethrough with the rising gases to secure the desired separation.

Air, after initial compression to a suitable pressure, for example 5 atmospheres or higher, and cooling in exchangers or regenerators (not shown) by heat exchange with outgoing products, is introduced through a pipe 14 to the high pressure section 5 of the primary column. In passing upwardly through the trays 8, the air is partially liquefied and rectified, with the result that a liquid enriched in oxygen accumulates in the bottom of the section. The residue, passing upwardly through tubes 15 of a condenser immersed in liquid produced in the low pressure section 6, is further liquefied to produce liquid nitrogen, part of which flows downwardly over the trays 8 in contact with the entering air while the remainder accumulates in a collector 16. The enriched oxygen liquid from the bottom of the high pressure section 5 is delivered by a pipe 17 through a pressure-reducing valve 18 to a condenser section 19 at the top of the auxiliary column 7, where it surrounds condenser tubes 20. Thence the liquid is delivered by a pipe 21 to an intermediate level of the low pressure section 6 of the primary column. The liquid nitrogen accumulating in the collector 16 is delivered through a pipe 22, pressure-reducing valve 23 and pipe 24, to the uppermost level of the low pressure section 6 and serves as a reflux liquid in the low pressure rectification.

The liquids, flowing downwardly over the trays 10, are subjected to vapors rising from the pool of liquid surrounding the tubes 15, with resulting separation of nitrogen which escapes as an effluent through a pipe 25 from the top of the low pressure section 6. After utilization as a cooling agent for the incoming air, the nitrogen may be discharged to the atmosphere or stored for any suitable purpose. A portion of the vapor from the pool of liquid surrounding the tubes 15 is withdrawn through a pipe 26 controlled by a valve 27. This constitutes the low purity oxygen output which, after utilization as a cooling agent for the incoming air, may be stored or utilized for its intended purpose. A second outlet 28 controlled by a valve 29 is provided at a higher level of the low pressure section 6. In an alternative procedure, this outlet is used for low purity oxygen, the valve 27 being in that case closed.

A portion of the liquid accumulating around the tubes 15 at the bottom of the low pressure section 6 of the primary column is delivered through a pipe 30 and valve 31 to an intermediate level of the auxiliary column 7. This liquid flows downwardly over the trays 12 and is met by vapor rising from liquid accumulated in the bottom of the column about condenser tubes 32. The rectification results in the separation of an oxygen liquid containing substantially all of the krypton-xenon in the bottom of the column. This liquid can be withdrawn through a pipe 33 controlled by a valve 34. At the upper end of the column, vapors rising from the uppermost tray are subjected to heat exchange in the tubes 20 with the surrounding liquid, with the result that an argon concentrate escapes through a pipe 35 controlled by a valve 36. The argon in the vapor phase may be delivered to any suitable storage receptacle. At an intermediate level in the column, vapors consist of high purity oxygen, i. e., 99.5% or better, and this product is withdrawn through a pipe 37 controlled by a valve 38. In an alternative procedure in which argon escapes with the low purity oxygen, the oxygen product may be withdrawn through the pipe 35 and delivered by a pipe 39 controlled by a valve 40 to the pipe 37.

The unliquefied residue from the tubes 15 at the bottom of the low pressure section 6 of the primary column includes neon and nitrogen. To separate the nitrogen, the residue is delivered through a pipe 41 to the bottom of the auxiliary column 7. It passes upwardly through the tubes 32 which are surrounded by the liquid product of the auxiliary rectification. The nitrogen is thus liquefied and accumulates in the bottom of the column. It is delivered through a pipe 42, controlled by a valve 43, to the pipe 24 and thus enters the top of the low pressure section 6 of the primary column with the nitrogen reflux liquid. The unliquefied residue from the tubes 32 consists of nitrogen with a high concentration of neon with helium and small amounts of hydrogen. It is withdrawn through a pipe 44 controlled by a valve 45 in the gaseous phase and may be delivered to any suitable receptacle.

In one procedure which may be carried out in the apparatus as described, the valve 29, as previously noted, is closed, while the valve 27 is open. In this case, argon accumulates in the liquid surrounding the tubes 15. It is separated in the auxiliary column 7 and withdrawn through the pipe 35 as previously described. The amount of liquid withdrawn for the production of high purity oxygen and of rare gases will contain oxygen equivalent to from 5 to 20% of the oxygen in the low purity oxygen product. If the vapor phase concentration of krypton-xenon is about 10% of that in the liquid phase, and the amount of material withdrawn as low purity oxygen is high in comparison with the liquid delivered to the auxiliary rectification, the resulting loss of krypton-xenon limits recovery of the latter to about 50% of all of the available krypton-xenon, but on the other hand, a considerable quantity of argon can be separated and recovered through the pipe 35.

If it is desired to produce a maximum of krypton-xenon, the valve 27 is closed and the low purity oxygen product is withdrawn through the pipe 28 at a higher level. The concentration of krypton-xenon in the vapor phase at this point is materially lower, and the loss of krypton-xenon is thus reduced to negligible proportions. However, in this case, most of the argon escapes with the low purity oxygen through the pipe 28. Consequently, very little argon accumulates in the liquid about the tubes 15, and argon is no longer available as a product which can be withdrawn through the pipe 35. In that case, the valve 38 is closed and the valve 40 opened. The high purity oxygen product is withdrawn through the pipe 35 and delivered by the pipe 39 to the pipe 37.

It will be apparent from the foregoing that the procedures as described permit the simultaneous recovery of low purity oxygen in large volume adapted for numerous industrial uses, the recovery of high purity oxygen for purposes to which it may be adapted, and the recovery also of a liquid oxygen concentrate containing a large proportion of the krypton-xenon available. Neon and argon may also be recovered. In the event that substantially all of the available krypton-xenon is desired, the argon is sacrificed in the low purity oxygen output.

The method and apparatus, therefore, afford a commercially practicable application of the principles of liquefaction and rectification for the recovery of available products from the atmosphere in substantially large proportions.

Various changes may be made in the details of procedure as described and in the apparatus employed without departing from the invention or sacrificing the advantages thereof.

I claim:

1. The method of recovering simultaneously high and low purity oxygen and krypton-xenon from the atmosphere by liquefaction and rectification which comprises subjecting compressed and cooled air to initial rectification and partial condensation to afford a liquid enriched in oxygen, liquid nitrogen and a residual vapor containing nitrogen and neon, condensing the nitrogen in the residual vapor, withdrawing neon, subjecting the oxygen and nitrogen products of the initial rectification with nitrogen condensed from the residual vapor to a second rectification, withdrawing nitrogen and a portion of the oxygen in the vapor phase, subjecting the liquid product of the second rectification to a third rectification, thereby separating an oxygen liquid rich in krypton-xenon, and withdrawing high purity oxygen in the vapor phase.

2. The method of recovering simultaneously high and low purity oxygen, krypton-xenon and argon from the atmosphere by liquefaction and rectification which comprises subjecting compressed and cooled air to initial rectification and partial condensation to afford a liquid enriched in oxygen, liquid nitrogen and a residual vapor containing nitrogen and neon, condensing the nitrogen in the residual vapor, withdrawing neon, subjecting the oxygen and nitrogen products of the initial rectification with nitrogen condensed from the residual vapor to a second rectification, withdrawing nitrogen and a portion of the oxygen in the vapor phase, subjecting the liquid product of the second rectification to a third rectification, thereby separating an oxygen liquid rich in krypton-xenon and argon in the vapor phase at opposite ends of the third rectification, and withdrawing high purity oxygen in the vapor phase, at an intermediate level thereof.

3. The method of recovering simultaneously high and low purity oxygen and krypton-xenon from the atmosphere by liquefaction and rectification which comprises subjecting compressed and cooled air to initial rectification and partial condensation to afford a liquid enriched in oxygen, liquid nitrogen and a residual vapor containing nitrogen and neon, condensing the nitrogen in the residual vapor by heat exchange with a liquid end product of a third rectification, withdrawing neon, subjecting the oxygen and nitrogen products of the initial rectification with nitrogen condensed from the residual vapor to a second rectification, withdrawing nitrogen and a portion of the oxygen in the vapor phase, subjecting the liquid product of the second rectification to a third rectification thereby separating oxygen liquid rich in krypton-xenon as the liquid end product, and withdrawing high purity oxygen in the vapor phase.

4. The method of recovering simultaneously high and low purity oxygen, krypton-xenon and argon from the atmosphere by liquefaction and rectification which comprises subjecting compressed and cooled air to initial rectification and partial condensation to afford a liquid enriched in oxygen, liquid nitrogen and a residual vapor containing nitrogen and neon, condensing the nitrogen in the residual vapor by heat exchange with a liquid end product of a third rectification, withdrawing neon, subjecting the oxygen and nitrogen products of the initial rectification with nitrogen condensed from the residual vapor to a second rectification, withdrawing nitrogen and a portion of the oxygen in the vapor phase, subjecting the liquid product of the second rectification to a third rectification thereby separating oxygen liquid rich in krypton-xenon as the liquid end product and argon in the vapor phase at opposite ends of the third rectification, and withdrawing high purity oxygen in the vapor phase, at an intermediate level thereof.

5. The method of recovering simultaneously high and low purity oxygen and krypton-xenon from the atmosphere by liquefaction and rectification which comprises subjecting compressed and cooled air to initial rectification and partial condensation to afford a liquid enriched in oxygen, liquid nitrogen and a residual vapor containing nitrogen and neon, condensing the nitrogen in the residual vapor, withdrawing neon, subjecting the oxygen and nitrogen products of the initial rectification with nitrogen condensed from the residual vapor to a second rectification, withdrawing nitrogen and a portion of the oxygen in the vapor phase, varying the level of withdrawal of the oxygen vapor to adjust the proportion of krypton-xenon in the liquid oxygen product of the second rectification, subjecting the liquid oxygen product of the second rectification to a third rectification, thereby separating oxygen liquid rich in krypton-xenon, and withdrawing high purity oxygen in the vapor phase.

WOLCOTT DENNIS.

REFERENCES CITED

The following references are of record in the file of this patent:

UNITED STATES PATENTS

| Number | Name | Date |
|---|---|---|
| 1,512,268 | Barbet | Oct. 21, 1924 |
| 1,963,809 | Schuffan | June 19, 1934 |
| 2,433,536 | Van Nuys | Dec. 30, 1947 |